US010840631B2

(12) United States Patent
Wu et al.

(10) Patent No.: US 10,840,631 B2
(45) Date of Patent: Nov. 17, 2020

(54) ELECTRONIC DEVICE AND CONNECTION MECHANISM THEREOF

(71) Applicant: ABILITY ENTERPRISE CO., LTD., New Taipei (TW)

(72) Inventors: Tzu-Peng Wu, New Taipei (TW); Hung-Chia Chang, New Taipei (TW); Wei-Hsiang Huang, New Taipei (TW)

(73) Assignee: ABILITY ENTERPRISE CO., LTD. (TW)

( * ) Notice: Subject to any disclaimer, the term of this patent is extended or adjusted under 35 U.S.C. 154(b) by 0 days.

(21) Appl. No.: 16/551,172

(22) Filed: Aug. 26, 2019

(65) Prior Publication Data

US 2020/0076112 A1 Mar. 5, 2020

(30) Foreign Application Priority Data

Aug. 31, 2018 (CN) ...................... 2018 2 1421085 U

(51) Int. Cl.
*H01R 13/44* (2006.01)
*H01R 13/447* (2006.01)
(52) U.S. Cl.
CPC ................................. *H01R 13/447* (2013.01)
(58) Field of Classification Search
CPC .............................. H01R 13/447; G03B 17/00
USPC ........................................................ 439/142
See application file for complete search history.

(56) References Cited

U.S. PATENT DOCUMENTS

| 5,743,752 | A | * | 4/1998 | Massebeuf | ........... | H01R 13/447 |
|---|---|---|---|---|---|---|
| | | | | | | 220/242 |
| 5,820,177 | A | * | 10/1998 | Moon | .................... | E05B 17/007 |
| | | | | | | 292/335 |
| 9,459,663 | B2 | * | 10/2016 | Wang | .................... | G06F 1/1658 |
| 2006/0232077 | A1 | * | 10/2006 | Courter | ................ | F24C 15/022 |
| | | | | | | 292/201 |
| 2012/0058677 | A1 | * | 3/2012 | Choi | ...................... | H01R 24/30 |
| | | | | | | 439/620.21 |
| 2012/0200989 | A1 | * | 8/2012 | Byrne | .................. | H01R 13/447 |
| | | | | | | 361/641 |
| 2013/0130524 | A1 | * | 5/2013 | Wang | ................... | H01R 13/447 |
| | | | | | | 439/142 |
| 2014/0170871 | A1 | * | 6/2014 | Wu | ...................... | H01R 13/447 |
| | | | | | | 439/131 |
| 2014/0370732 | A1 | * | 12/2014 | Curtis | .................... | H01R 24/28 |
| | | | | | | 439/142 |
| 2015/0020798 | A1 | * | 1/2015 | Elgaard | ............ | A61M 15/0071 |
| | | | | | | 128/200.23 |

(Continued)

*Primary Examiner* — Abdullah A Riyami
*Assistant Examiner* — Nelson R. Burgos-Guntin
(74) *Attorney, Agent, or Firm* — Innovation Counsel LLP

(57) ABSTRACT

An electronic device and a connection mechanism thereof are provided. The connection mechanism includes a first assembly and a second assembly. The first assembly has a first body, a first pivot portion and a limiting portion. The first body is connected to the first pivot portion and the limiting portion. The limiting portion has an accommodation slot and a notch. The second assembly has a second body, a second pivot portion and a blocker. The second body is connected to the second pivot portion and the blocker. The first assembly and the second assembly are pivotally connected with each other by the first pivot portion and the second pivot portion. The first assembly and the second assembly are engagable with each other by the blocker and the notch.

20 Claims, 7 Drawing Sheets

(56) References Cited

U.S. PATENT DOCUMENTS

| | | | |
|---|---|---|---|
| 2015/0124384 A1* | 5/2015 | Tseng | H01R 13/447 361/679.02 |
| 2015/0173223 A1* | 6/2015 | Binner | H05K 7/1428 174/50 |
| 2020/0076112 A1* | 3/2020 | Wu | H01R 13/447 |

* cited by examiner

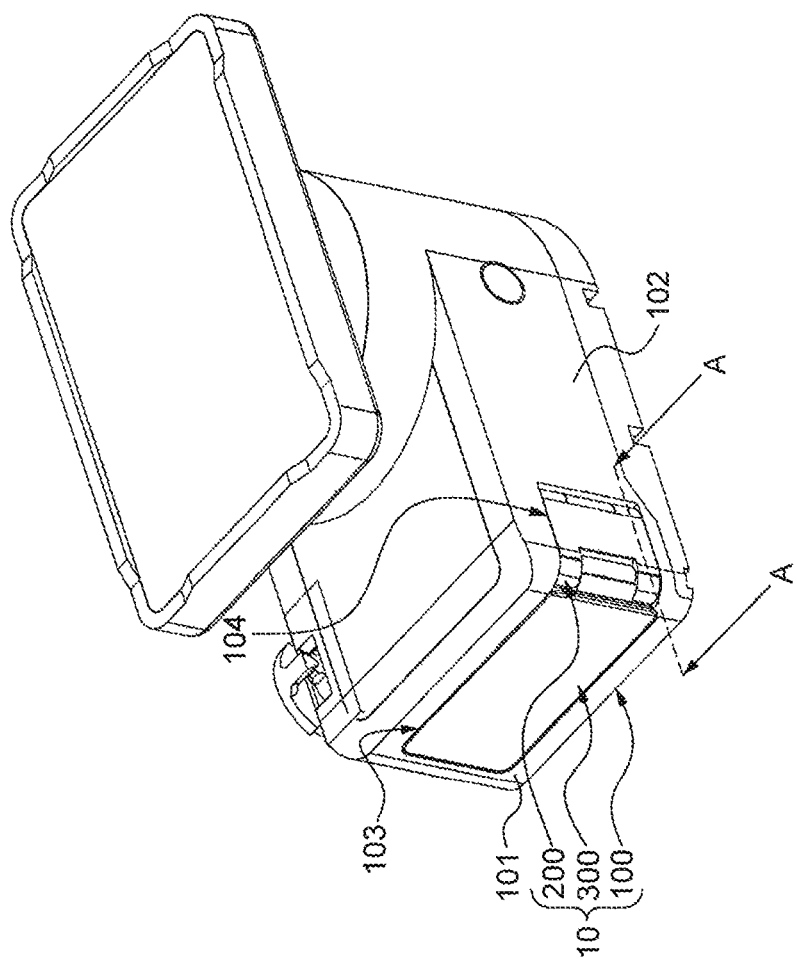

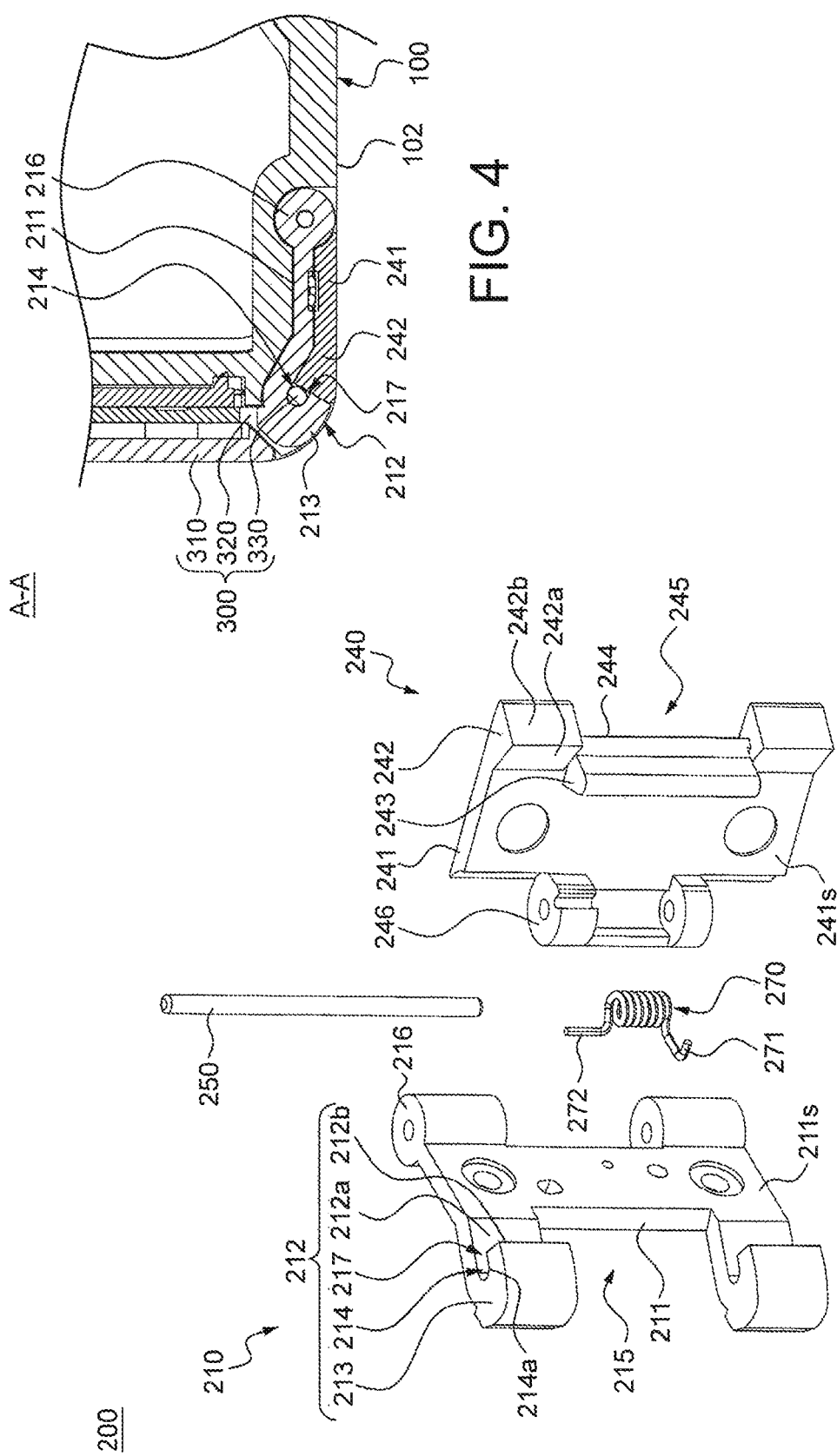

ELECTRONIC DEVICE AND CONNECTION MECHANISM THEREOF

This application claims the benefit of People's Republic of China Application No. 201821421085.0, filed Aug. 31, 2018, the disclosure of which is incorporated by reference herein in its entirety.

TECHNICAL FIELD

The disclosure relates to a connection mechanism, and more particularly to an electronic device and a connection mechanism thereof wherein an extraneous element can be easily assembled and disassembled.

BACKGROUND

Generally, an electrical connection slot (such as a USB slot and an external slot) is provided in an opening on one side of a conventional electronic device (such as a digital camera and a mobile phone) for an expansion device (such as an external hard disk and an expansion battery) with a specific function to be externally attached thereto. When an expansion device is not externally attached to the electronic device, the electronic device may cover the opening and shield the electrical connection slot through an outer cover to protect the electrical connection slot and ensure the overall appearance of the electronic device.

However, when the expansion device is externally attached to the electronic device, since the expansion device protrudes from the opening of the electronic device, the outer cover cannot cover the opening. Thus, the outer cover may swing back and forth outside the electronic device, which not only affects the overall appearance of the electronic device, but also causes damage to the outer cover due to collision and pulling under continual shaking.

Therefore, how to develop a solution to improve the above drawback and inconvenience is an important issue that the relevant industry desires to resolve.

SUMMARY

According to one embodiment of the present disclosure, a connection mechanism is provided. The connection mechanism includes a first assembly and a second assembly. The first assembly has a first body, a first pivot portion and a limiting portion. The first body is connected to the first pivot portion and the limiting portion, and the limiting portion has an accommodation slot and a notch. The second assembly has a second body, a second pivot portion and a blocker. The second body is connected to the second pivot portion and the blocker. The first assembly and the second assembly are pivotally connected with each other by the first pivot portion and the second pivot portion, and the first assembly and the second assembly engagable with each other by the blocker and the notch.

According to one or more embodiments of the present disclosure, the above connection mechanism further includes a pivot. The first pivot portion and the second pivot portion are connected with each other by the pivot, and the second assembly and the first assembly are rotatable relative to each other.

According to another embodiment of the present disclosure, a connection mechanism adapted to be disposed on a housing is provided. The connection mechanism includes a first assembly, a second assembly and an elastic element. The first assembly has a first body and a limiting portion. The limiting portion is disposed on one end of the first body. The limiting portion has an accommodation slot and a notch. The second assembly has a second body and a blocker. The blocker is disposed on one end of the second body. The blocker is removably disposed on the notch. The elastic element is disposed between the first body and the second body.

According to one or more embodiments of the present disclosure, the above connection mechanism further includes a pivot. The first assembly further has a first pivot portion disposed on another end of the first body. The second assembly further has a second pivot portion disposed on another end of the second body. The first pivot portion and the second pivot portion are connected with each other by the pivot, and the second assembly and the first assembly are rotatable relative to each other.

According to one or more embodiments of the present disclosure, in the above connection mechanism, the first assembly has a sliding slot, the second body of the second assembly is a slider, the slider is slidably disposed in the sliding slot, and the second assembly and the first assembly are slidable relative to each other.

According to one or more embodiments of the present disclosure, in the above connection mechanism, the first body has a first surface, and the second body has a second surface. The first assembly further has a first extending face and a first end face, and the second assembly further has a second extending face and a second end face. The first extending face is connected to the first surface, an inner side face of the accommodation slot is connected to the first extending face and the first end face. The second extending face is connected to the second surface and the second end face, and the first extending face and the second extending face are respectively an inclined surface.

According to a further embodiment of the present disclosure, an electronic device is provided. The electronic device includes a housing, a connection mechanism and an extraneous element. The connection mechanism includes a first assembly and a second assembly. The first assembly has a first body and a limiting portion. The limiting portion is disposed on one end of the first body, and the limiting portion has an accommodation slot and a notch. The first body is disposed on the housing. The second assembly has a second body and a blocker. The blocker is disposed on one end of the second body. The second body is movably disposed on the first body. The extraneous element has a connection portion. The extraneous element and the connection mechanism are pivotally connected with each other by the connection portion and the accommodation slot, and the blocker is removably disposed on the notch.

According to one or more embodiments of the present disclosure, in the above electronic device, the housing has an opening, a first side face and a second side face. The first side face and the second side face are connected with each other. The opening is disposed on the first side face, the first body is disposed on the first side face or the second side face, and the extraneous element is removably disposed on the opening.

According to one or more embodiments of the present disclosure, in the above electronic device, the extraneous element further has a protrusion. The connection portion is a shaft, and the shaft is disposed on the protrusion and rotatably disposed in the accommodation slot.

According to one or more embodiments of the present disclosure, in the above electronic device, the second assembly has a first stop portion disposed on the end of the second body, the extraneous element has a second stop portion formed on the protrusion. When the second stop portion abuts the first stop portion, the first stop portion stops the extraneous element moving.

Thus, through the electronic device and the connection mechanism thereof according the above embodiments, when the extraneous element (such as the expansion device) is externally attached to the electronic device, the blocker may recede so that the extraneous element can be removed from the accommodation slot without using tools. Therefore, it does not affect the overall appearance of the electronic device, and also avoids damage to the extraneous element caused by collision and pulling under continual shaking.

The above description is only for explaining the problems to be solved, the technical means for solving the problems, the effects thereof, and the like of the present disclosure. A detailed description of the present disclosure will be described in the following embodiments and related drawings.

BRIEF DESCRIPTION OF THE DRAWINGS

The above and other objects, features, advantages and embodiments of the present disclosure will be more apparent and understood with the description of the drawings as follows.

FIG. 1 shows a three dimensional view of an electronic device according to one embodiment of the present disclosure.

FIG. 3 shows a breakdown drawing of the connection mechanism of the electronic device of FIG. 1.

FIG. 4 shows a cross-sectional view of the electronic device of FIG. 1 along line A-A.

DETAILED DESCRIPTION

Figure 2A:
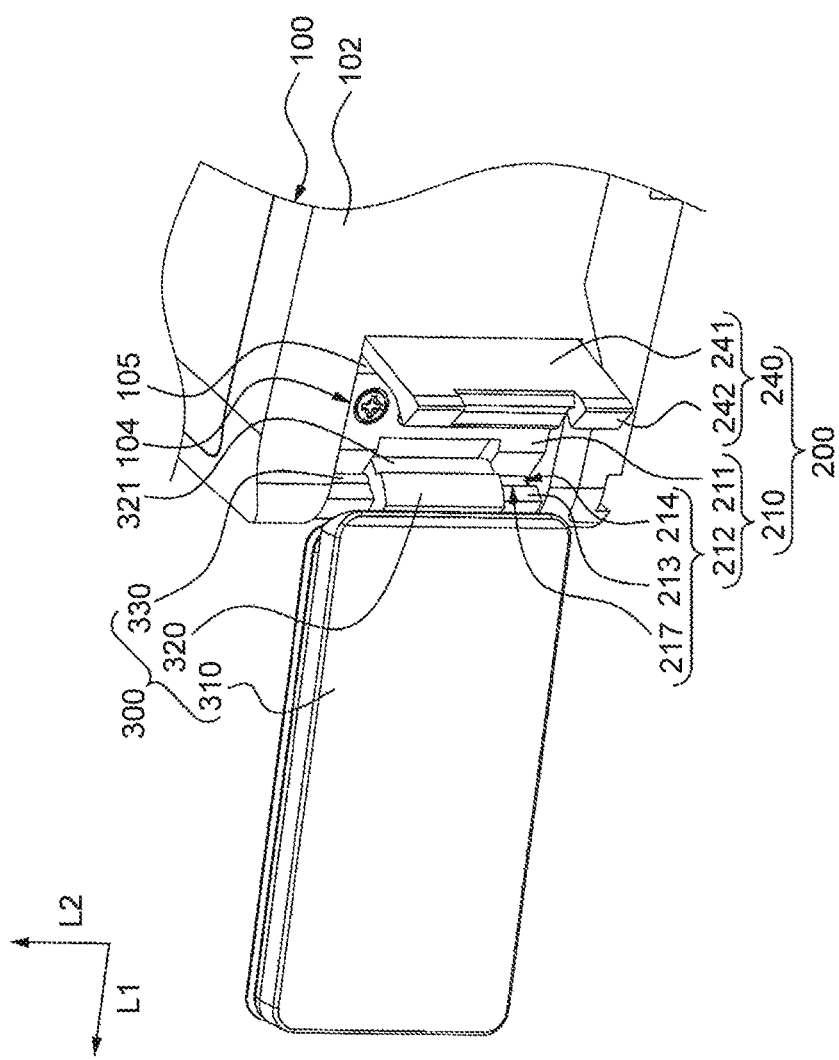
FIG. 2A and FIG. 2B respectively show operational schematic diagrams of the electronic device of FIG. 1.

In the following description, various embodiments of the present disclosure are disclosed with the following drawings, and for the sake of clarity, many of the details in practice will also be described. However, it should be understood by those skilled in the art that these details in practice should not be a limitation to the present disclosure. That is, these details in practice are not essential to the embodiments of the present disclosure. Furthermore, to simplify the drawings, some well-known structures and elements are shown in the drawings with a simplified schematic representation.

Figure 2B:
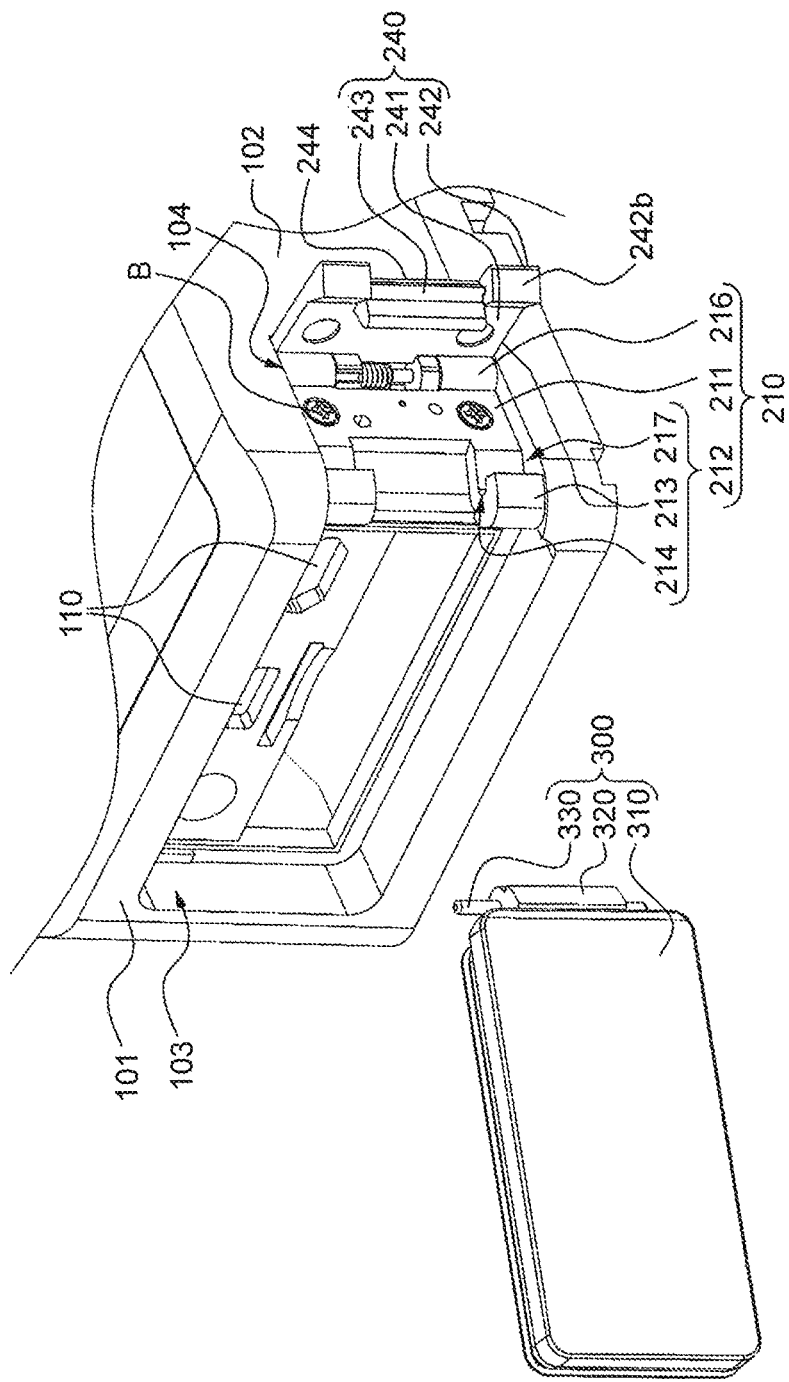

FIG. 1 shows a three dimensional view of an electronic device 10 according to one embodiment of the present disclosure. FIG. 2A and FIG. 2B respectively show operational schematic diagrams of the electronic device 10 of FIG. 1. As shown in FIG. 1, FIG. 2A and FIG. 2B, in the present embodiment, the electronic device 10 includes a housing 100, a connection mechanism 200 and an extraneous element 300. The extraneous element 300 is disposed on the housing 100 through the connection mechanism 200. The connection mechanism 200 includes a first assembly 210 and a second assembly 240. The second assembly 240 is disposed on the first assembly 210, and the second assembly 240 and the first assembly 210 are movable relative to each other. The first assembly 210 has at least one limiting portion 212. The extraneous element 300 is disposed on the connection mechanism 200 through the limiting portion 212. The second assembly 240 has at least one blocker 242. The position of the blocker 242 on the second assembly 240 corresponds to the position of the limiting portion 212 on the first assembly 210. The blocker 242 is removably disposed on the limiting portion 212. That is, the first assembly 210 and the second assembly 240 may engage with each other by the blocker 242 and the limiting portion 212. When the blocker 242 is disposed on the limiting portion 212, the blocker 242 prevents the extraneous element 300 from being detached from the limiting portion 212 (FIG. 1). In one embodiment, when the blocker 242 is disposed on the limiting portion 212, the blocker 242 covers the limiting portion 212. On the other hand, when the blocker 242 is not disposed on the limiting portion 212 and away from the limiting portion 212, the extraneous element 300 may be detached from the limiting portion 212 (FIG. 2B).

In the present embodiment, when the extraneous element 300 is disposed at the limiting portion 212 and the blocker 242 is disposed on the limiting portion 212 to interfere with the extraneous element 300, the extraneous element 300 may be firmly disposed on the housing 100 through the connection mechanism 200; inversely, as shown in FIG. 2B, when the blocker 242 leaves the limiting portion 212, that is, when the blocker 242 is not disposed on the limiting portion 212, the blocker 242 recedes so that the extraneous element 300 can be easily and rapidly removed from the limiting portion 212. Thus, the electronic device 10 without the extraneous element 300 not only does not affect the overall appearance thereof, but also reduces the chance that the extraneous element 300 is damaged.

In the present embodiment, the blocker 242 may be disposed on the limiting portion 212 or leave the limiting portion 212 as the second assembly 240 moves. More specifically, the limiting portion 212 has an accommodation slot 214 and a notch 217. The extraneous element 300 has at least one connection portion 330. The connection portion 330 of the extraneous element 300 may enter the accommodation slot 214 from the notch 217, and be disposed in the accommodation slot 214. In the present embodiment, the first assembly 210 and the second assembly 240 may engage with each other by the blocker 242 and the notch 217. When the blocker 242 is disposed on the limiting portion 212, the blocker 242 is disposed on the notch 217, and the blocker 242 covers the notch 217. For example, the blocker 242 has a second end face 242b, and when the blocker 242 is disposed on the limiting portion 212, the second end face 242b of the blocker 242 is disposed on the notch 217. In other words, the blocker 242 covers the notch 217 with the second end face 242b. That is, the blocker 242 may be removably disposed on the notch 217. The connection portion 330 of the extraneous element 300 may be restricted in the accommodation slot 214 under the block of the blocker 242 (FIG. 1). The connection portion 330 of the extraneous element 300 cannot be detached from the accommodation slot 214 and the limiting portion 212 under the confines of the limiting portion 212 and the blocker 242. The extraneous element 300 and the connection mechanism 200 are engagable with each other through the connection portion 330 and the accommodation slot 214. The connection portion 330 of the extraneous element 300, which may for example be a shaft, is rotatably disposed in the accommodation slot 214. The extraneous element 300 may not only be disposed on the housing 100 through the connection mechanism 200, but also be rotatable relative to the connection mechanism 200 and the housing 100. In different embodiments, the notches 217 may be open in different directions, and the position of the blocker 242 on the second assembly 240 may be designed according to the opening direction of the notch 217.

Furthermore, the electronic device 10 has an internal circuit (not illustrated in the drawing), and the internal circuit is disposed in the housing 100. The internal circuit has at least one electrical connection slot 110 (such as a USB slot and an external slot). The electrical connection slot 110 may be electrically coupled to an expansion device (such as an external hard disk and an expansion battery). However, the internal circuit may further consist of other electronic elements required by the electronic device 10, for example but not limited to: the internal circuit may further has a circuit board, a processor, a storage such as a memory and a hard disk, a power module, a transmission module, a transmission interface and so on. The electrical connection slot 110 may be electrically coupled to the above electronic elements. A first opening 103 is arranged on a first side face 101 of the housing 100. The electrical connection slot 110 may be exposed to the outside of the housing 110 through the first opening 103. In the present embodiment, the connection mechanism 200 is disposed on a second side face 102 of the housing 100. The second side face 102 and the first side face 101 are connected with each other. A second opening 104 is arranged on the second side face 102 of the housing 100. The first assembly 210 is disposed in the second opening 104 of the housing 100, and fixed on the bottom surface 105 of the housing 100. In the present embodiment, the extraneous element 300 is, for example, a shielding cover. The extraneous element 300 is removably disposed on the first opening 103 and shields the electrical connection slot 110. In other words, the extraneous element 300 may rotate to different positions so as to shield or not shield the electrical connection slot 110.

In the present embodiment, as shown in FIG. 2B, the electrical connection slot 110 is disposed on the first side face 101 of the housing 100, and the first assembly 210 is disposed on the second side face 102 of the housing 100. Thus, the extraneous element 300 may rotate to the first side face 101 of the housing 100 to be disposed on the first opening 103, and shield the electrical connection slot 110. However, the present disclosure is not limited thereto. In other embodiments, the electrical connection slot 110 and the first assembly 210 may be disposed on the same side face of the housing 100. Thus, after being assembled to the connection mechanism 200 and disposed on the first opening, the extraneous element 300 may shield the electrical connection slot 110. That is, the extraneous element 300, the connection mechanism 200 and the electrical connection slot 110 are all disposed on the same side face of the housing.

FIG. 3 shows a breakdown drawing of the connection mechanism 200 of the electronic device 10 of FIG. 1. FIG. 4 shows a cross-sectional view of the electronic device 10 of FIG. 1 along line A-A. As shown in FIG. 3 and FIG. 4, the first assembly 210 of the connection mechanism 200 includes a first body 211, a first pivot portion 216 and at least one limiting portion 212. The first body 211 and the housing 100 may be connected, combined or assembled with each other. For example, the first body 211 is fastened to the housing 100 through the bolt B (as shown in FIG. 2B). However, the present disclosure is not limited thereto. The first body 211 is connected to the limiting portion 212 and the first pivot portion 216. In the present embodiment, the first assembly 210 further has a first accommodation space 215 disposed between the first body 211 and the limiting portion 212. For example, the first assembly 210 has two limiting portions 212 disposed on one side of the first body 211 at an interval, and the first accommodation space 215 is formed between the first body 211 and the two limiting portions 212. The second assembly 240 of the connection mechanism 200 has a second body 241, a second pivot portion 246 and at least one blocker 242. The second body 241 is connected to the blocker 242 and the second pivot portion 246. In the present embodiment, the second assembly 240 further has a second accommodation space 245 disposed between the second body 241 and the blocker 242. For example, the second assembly 242 has two blocker 242 disposed on one side of the second body 241 at an interval, and the second accommodation space 245 is formed between the second body 241 and the two blockers 242. The blockers 242 correspond to the limiting portions 212.

The first assembly 210 and the second assembly 240 are pivotally connected with each other by the first pivot portion 216 and the second pivot portion 246. For example but not limited to: the connection mechanism 200 further includes a pivot 250. The first pivot portion 216 is pivotally connected to the second pivot portion 246 through the pivot 250. That is, the second assembly 240 is pivotally connected to the first assembly 210. That is, the second body 241 and the first body 211 are rotatable relative to each other through the pivot 250, the first pivot portion 216 and the second pivot portion 246. However, in other embodiments, the connection mechanism 200 may not include the additional pivot 250. For example but not limited to: the first pivot portion 216 and the second pivot portion 246 may respectively have corresponding protruding shaft and groove, and the first pivot portion 216 and the second pivot portion 246 may be rotatable relative to each other by the protruding shaft and groove. The second body 241 and the first body 211 may cover each other up or be away from each other. In the present embodiment, the first body 211 has a first surface 211*s*, and the second body 241 has a second surface 241*s* opposite to the first surface 211*s*. The limiting portion 212 has a first extending face 212*a* and a first end face 212*b*. The first extending face 212*a* is connected to the first surface 211*s*. The blocker 242 has a second extending face 242*a* and the second end face 242*b*. The second extending face 242*a* is connected to the second surface 241*s*. In the present embodiment, when the first assembly 210 and the second assembly 240 are in an engagement state, the second body 241 and the first body 211 cover each other up, the second surface 241*s* is removably disposed on the first surface 211*s*, the second extending face 242*a* is removably disposed on the first extending face 212*a*, and the second end face 242*b* is removably disposed on the first end face 212*b*. For example, the second surface 241*s* and the first surface 211*s* overlap with each other, the second extending face 242*a* and the first extending face 212*a* overlap with each other, and at least a portion of the second end face 242*b* and the first end face 212*b* overlap with each other. That is, the blocker 242 is located on the limiting portion 212, the blocker 242 covers the notch 217 with the second end face 242*b* to close the accommodation slot 214, and the second accommodation space 245 communicates with the first accommodation space 215. The connection portion 330 of the extraneous element 300 is rotatably disposed in the accommodation slot

214. The extraneous element 300 may not only be disposed on the housing 100 through the connection mechanism 200, but also be rotatable relative to the connection mechanism 200. When the first assembly 210 and the second assembly 240 are in an engagement release state, the blocker 242 is away from the limiting portion 212 and is not disposed on the notch 217. That is, the blocker 242 does not cover the notch 217.

Further, each limiting portion 212 includes a hook 213 having a recessed notch, and each hook 213 defines the accommodation slot 214. In other words, the accommodation slot 214 is the recessed notch of the hook 213, and the recessed notch is formed on a side of the hook 213 facing away from the housing 100 rather than facing the housing 100. The inner side face 214a of the accommodation slot 214 is connected to the first extending face 212a and the first end face 212b. Each accommodation slot 214 is adapted to receive the connection portion 330 of the extraneous element 300 (such as a shaft). Thus, when each blocker 242 is located on one limiting portion 212, the blocker 242 covers the notch 217. Therefore, the connection portion 330 of the extraneous element 300 cannot enter or exit the accommodation slot 214 via the notch 217.

In one embodiment that the extraneous element 300 is a shielding cover, the extraneous element 300 includes a main structure 310, a protrusion 320 and at least one connection portion 330. The protrusion 320 is disposed on one end of the main structure 310. In the present embodiment, the extraneous element includes two connection portions 330 (such as two shafts) coaxially disposed on two opposite ends of the protrusion 320. In one embodiment, the longitudinal direction L1 of the main structure 310 is orthogonal to the longitudinal direction L2 of any of the shafts 330 (FIG. 2A). When the shielding cover is under the confines of the limiting portion 212, the protrusion 320 is disposed in the second accommodation space 245 and the first accommodation space 215, and each connection portion 330 is rotatably disposed in one accommodation slot 214 since the second assembly 240 and the first assembly 210 are in an engagement state. In other embodiments, the extraneous element 300 includes a connection portion 330 (such as a shaft) disposed through the protrusion 320, and the length of the connection portion 330 may be longer than the length of the protrusion 320. Therefore, the two ends of the connection portion 330 may respectively protrude from two opposite ends of the protrusion 320, and each end of the connection portion 330 is rotatably disposed in one accommodation slot 214.

However, the present disclosure is not limited to that the second assembly 240 must be pivotally connected to the first assembly 210. In other embodiments, the second assembly 240 is provided with elastic material, and one end of the second body 241 is connected to one end of the first body 211. For example but not limited to: one end of the second body 241 is fastened to one end of the first body 211. The limiting portion 212 is located on another end of the first assembly 210, and the blocker 242 is located on another end of the second assembly 240 so as to follow the principle that the second assembly 240 is movably connected to the first assembly 210. Or, the blocker 242 is detachably and vertically disposed on the limiting portion 212.

For example, the first assembly 210 and the second assembly 240 may connected with each other by a telescopic mechanism. The telescopic mechanism may be retractable along a direction perpendicular to the first assembly 210 and the second assembly 240. Thus, the first assembly 210 and the second assembly 240 may be away from or close to each other through the telescopic mechanism.

Furthermore, in above embodiments, the connection mechanism 200 further includes an elastic element 270. The elastic element 270 may be a torsion spring and be pivotally connected to the first assembly 211 and the second assembly 240. However, the present disclosure is not limited thereto. The elastic element 270 is disposed between the first assembly 210 and the second assembly 240. For example, the elastic element 270 is disposed between the first body 211 of the first assembly 210 and the second body 241 of the second assembly 240. As shown in FIG. 3, the elastic element 270 has a first end portion 271 and a second end portion 272 opposite to the first end portion 271. The first end portion 271 is connected to one end of the first body 211 opposite to the limiting portion 212, and the second end portion 272 is connected to one end of the second body 241 opposite to the blocker 242. The first end portion 271 and the second end portion 272 may be directly connected to the first body 211 and the second body 241. Or, as shown in FIG. 3, the first end portion 271 is directly connected to the first body 211, and the second end portion 272 is connected to the second body 241 via the second pivot portion 246. For example, the second end portion 272 is disposed in a recess of the second pivot portion 246. The elastic element 270, with its elastic force, holds the second assembly 240 and the first assembly 210 in an engagement state. Thus, when the second assembly 240 is rotated by an external force and away from the first assembly 210 (FIG. 2A), the extraneous element 300 may be detached from the limiting portion 212 from the notch 217 (FIG. 2B). When the force is released, the second assembly 240 and the first assembly 210 may return to the engagement state automatically through the elastic element 270.

As shown in FIG. 3, the second assembly 240 further has a flange 243. The flange 243 is located at the end of the second body 241 which has two blockers 242 disposed thereon, and located between the two blockers 242. When the second assembly 240 and the first assembly 210 are in the engagement state, the flange 243 of the second assembly 240 extends into the first accommodation space 215 of the first assembly 210, and engages with a side edge of the first body 211 facing the first accommodation space 215. Thus, the force that the second assembly 240 is coupled to the first assembly 210 is further enhanced to reduce the chance that the connection portion 330 of the extraneous element 300 (i.e., the shielding cover) is easily detached from the connection mechanism 200. Furthermore, the external force may be applied to the second assembly 240 with the flange 243 as a point of application, so that the second assembly 240 is rotated and away from the first assembly 210 (FIG. 2A).

It should be understood that in the present embodiment, as shown in FIG. 4, when the blocker 242 is located on the notch 217, the blocker 242 not only directly contacts with the hook 213, but also may contact with the connection portion 330 inside the accommodation slot 214. Thus, it may ensure that the connection portion 330 would not shake in the accommodation slot 214. However, the present disclosure is not limited thereto. In other embodiments, the blocker 242 may also maintain a gap with the connection portion 330 inside the accommodation slot 214 so as to avoid excessive wear of the connection portion 330.

Figure 5:
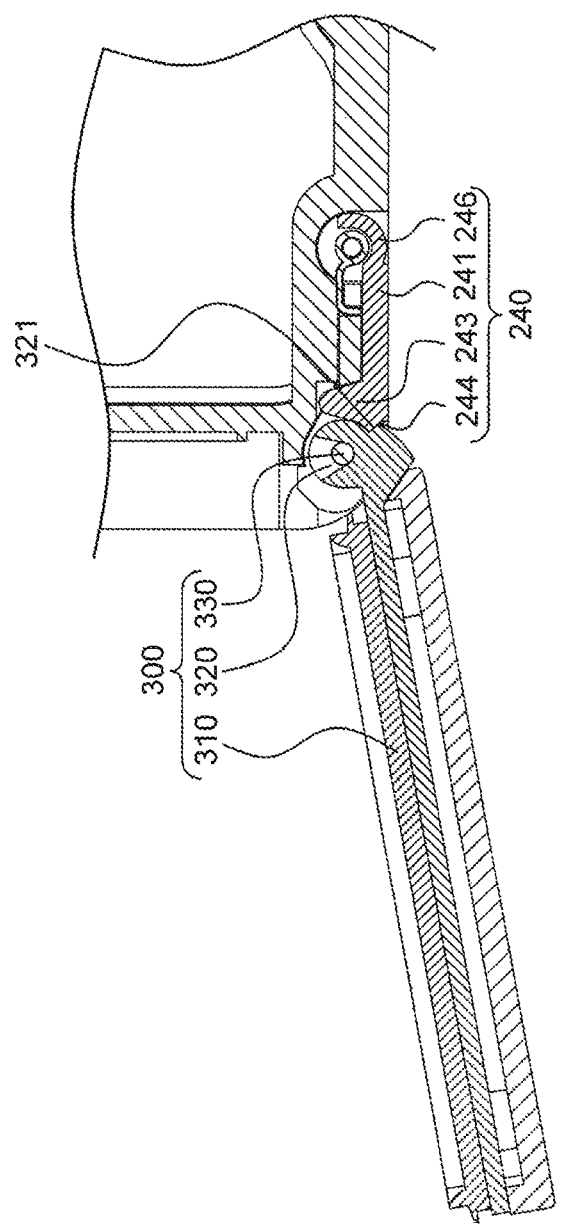
FIG. 5 shows an operational schematic diagram of the electronic device of FIG. 1 for opening the extraneous element.

Moreover, FIG. 5 shows an operational schematic diagram of the electronic device 10 of FIG. 1 for opening the extraneous element 300, wherein the cross-sectional line pass through the flange 243 of the connection mechanism

200. As shown in FIG. 3 and FIG. 5, in the above embodiments, the second assembly 240 has a first stop portion 244 at one end. The first stop portion 244 is a side face of the flange 243, and the first stop portion 244 is located on one end of the second body 241 and between the two blockers 242. The extraneous element 300 (i.e., the shielding cover) has a second stop portion 321 at one end. The second stop portion 321 is for example a concave face (FIG. 2A), and the second stop portion is located on one side of the protrusion 320 facing away from the main structure 310.

As such, when the extraneous element 300 is rotated and away from the first opening 103 of the housing 100, the second stop portion 321 abuts the first stop portion 244, so that the first stop portion 244 can stop the extraneous element 300 rotating. On one hand, the maximum angle at which the extraneous element 300 rotates away from the first opening 103 of the housing 100 may be controlled, and one the other hand, it may prevent the blocker 242 from being pushed away by the rotation of the extraneous element 300 so as to reduce the chance that the connection portion 330 of the extraneous element 300 (i.e., the shielding cover) is easily detached from the connection mechanism 200.

Figure 6:
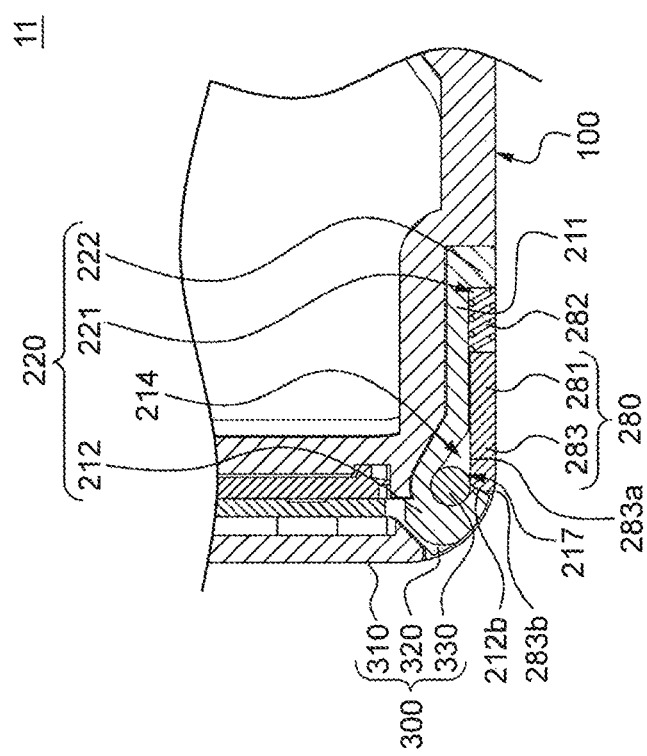
FIG. 6 shows a partially cross-sectional view of an electronic device according to one embodiment of the present disclosure, the viewing direction of which is the same with FIG. 4.

FIG. 6 shows a partially cross-sectional view of an electronic device 11 according to one embodiment of the present disclosure, the viewing direction of which is the same with FIG. 4. The electronic device 11 as shown in FIG. 6 is substantially identical to the electronic device 10 as shown in FIG. 4, and the same symbols are used to denote the same components. One difference between the electronic device 11 of FIG. 6 and the electronic device 10 of FIG. 4 is in that: the second assembly 280 is slidably connected to the first assembly 220. That is, the second assembly 280 is slidable relative to the first assembly 210 instead of being pivotally connected to the first assembly 210. For example but not limited to: the second assembly 280 has a blocker 283 and a slider 281. The blocker 283 is connected to one end of the slider 281. In other words, the slider 281 of the second assembly 280 corresponds to the second body 241 of the second assembly 240 in the previous embodiment (FIG. 2A). Furthermore, the first assembly 220 of the present embodiment has a sliding slot 221 and a stopper 222. The stopper 222 may be disposed on the first body 211, or be a part of the first body 211 such as a structure of the first body 211 protruding from one end along a direction facing away from the housing 100. The slider 281 may be slidably disposed in the sliding slot 221 in a linear motion. The blocker 283 has a second extending face 283a and a second end face 283b connected with each other. In the present embodiment, the second extending face 283a and the slider 281 have surfaces that are coplanar. When the first assembly 220 and the second assembly 280 are in an engagement state, the second end face 283b is removably disposed on the first end face 212b, and the second extending face 283a covers the notch 217. The elastic element 282 in the present embodiment may be a telescopic spring. The elastic element 282 is disposed between the slider 281 and the stopper 222. For example, the two end portions of the elastic element 282 are respectively connected to the slider 281 and the stopper 222. The blocker 283 is located on one end of the slider 281 facing away from the elastic element 282. When the slider 281 slides and compresses the elastic element 282, the blocker 283 moves away from the limiting portion 212 and the connection portion 330, and the first assembly 220 and the second assembly 280 are in an engagement release state. Therefore, the connection portion 330 of the extraneous element 300 may be detached from the accommodation slot 214 and the limiting portion 212 from the notch 217.

Figure 7:
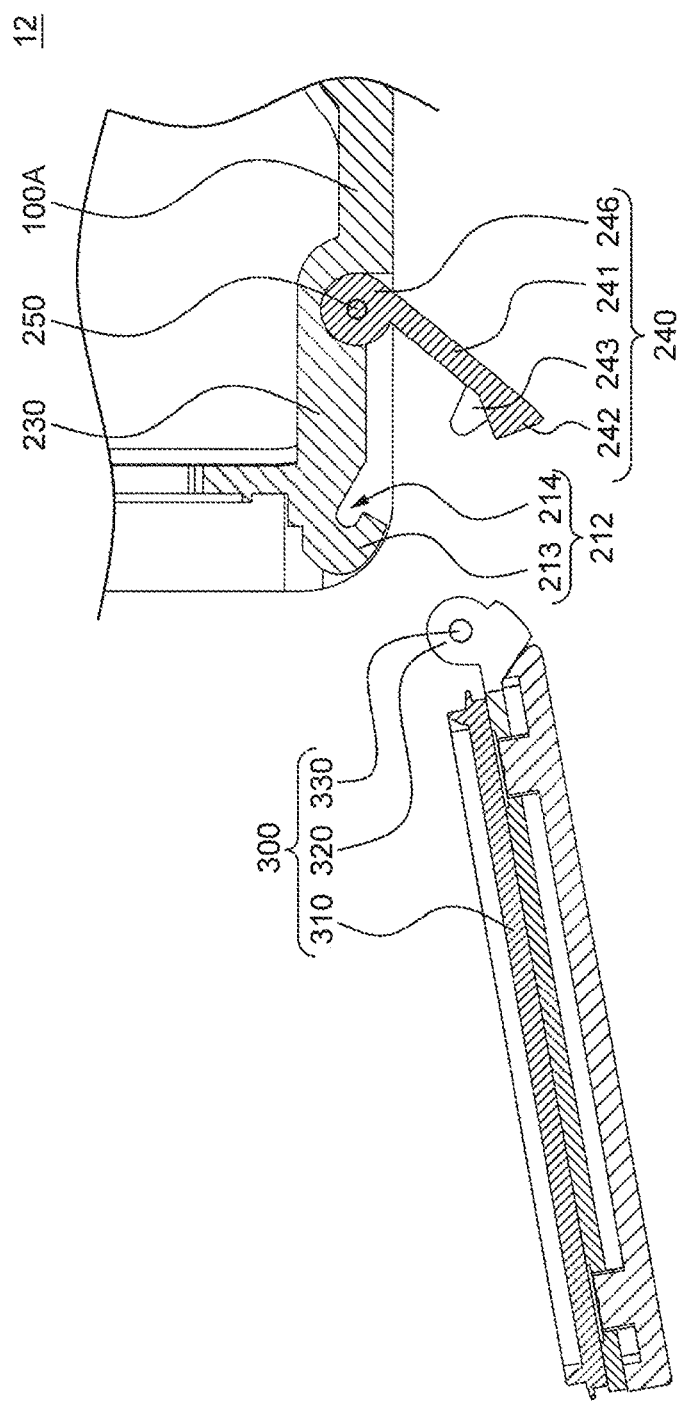
FIG. 7 shows a partially cross-sectional view of an electronic device according to one embodiment of the present disclosure, the viewing direction of which is the same with FIG. 4.

FIG. 7 shows a partially cross-sectional view of an electronic device 12 according to one embodiment of the present disclosure, the viewing direction of which is the same with FIG. 4. The electronic device 12 as shown in FIG. 7 is substantially identical to the electronic device 10 as shown in FIG. 4, and the same symbols are used to denote the same components. One difference between the electronic device 12 of FIG. 7 and the electronic device 10 of FIG. 4 is in that: the first assembly 230 is integrally connected to the housing 100A instead of being assembled to the housing through the bolt. The second pivot portion 246 of the second assembly 240 is pivotally connected to the first assembly 230 through the pivot 250. Thus, integrally forming the limiting portion 212 of the first assembly 230 on the housing 100A may reduce the cost and process complexity of the first assembly 230.

In all of the above embodiments, the electronic device may for example be a digital camera or a mobile phone. However, the present disclosure is not limited thereto. The extraneous element of the present disclosure is not merely limited to the shielding cover. In other embodiments, the extraneous element may for example be an expansion device or a supporting frame. The expansion device is used to provide the electronic device with specific auxiliary functions. For example but not limited to: the expansion device is an electronic component such as an external microphone, an external fill light, a photometer and an auxiliary screen. The supporting frame is used to support the electronic device on a bearing surface. The expansion device and the supporting frame do not have to cover the electrical connection slot on one side of the electronic device.

In the above embodiments, when the blocker of the second assembly is disposed on the limiting portion of the first assembly, the blocker may close the accommodation slot, thereby preventing the connection portion of the extraneous element from being detached from the accommodation slot via the notch. On the other hand, when the blocker of the second assembly is not disposed on the limiting portion of the first assembly, that is, the blocker and the limiting portion separate from each other, the extraneous element may be removed from the limiting portion easily and quickly under the confines of the blocker. Thus, the electronic device without the extraneous element not only does not affect the overall appearance thereof, but also improves the convenience of the electronic device on use, and reduces the chance that the extraneous element is damaged.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A connection mechanism comprising:
a first assembly having a first body, a pivot portion and a limiting portion, the first body connected to the first pivot portion and the limiting portion, and the limiting portion having an accommodation slot and a notch; and
a second assembly having a second body, a second pivot portion and a blocker, the second body connected to the second pivot portion and the blocker, the first assembly and the second assembly pivotally connected with each other by the first pivot portion and the second pivot portion, and the first assembly and the second assembly engagable with each other by the blocker and the notch.

2. The connection mechanism according to claim 1, further comprising a pivot, wherein the first pivot portion and the second pivot portion are connected with each other by the pivot, and the second assembly and the first assembly are rotatable relative to each other.

3. The connection mechanism according to claim 1, wherein the first assembly further has a sliding slot, the second body of the second assembly is a slider, and the slider is slidably disposed in the sliding slot.

4. The connection mechanism according to claim 1, wherein the first body has a first surface, the second body has a second surface, the first assembly further has a first extending face and a first end face, the second assembly further has a second extending face and a second end face, the first extending face is connected to the first surface, an inner side face of the accommodation slot is connected to the first extending face and the first end face, the second extending face is connected to the second surface and the second end face, and the first extending face and the second extending face are respectively an inclined surface.

5. An electronic device comprising:
the connection mechanism according to claim 1;
a housing, the first body disposed on the housing; and
an extraneous element having a connection portion, the extraneous element and the connection mechanism pivotally connected with each other by the connection portion and the accommodation slot, and the blocker removably disposed on the notch.

6. The electronic device according to claim 5, wherein the extraneous element further has a protrusion, the connection portion is a shaft, and the shaft is disposed on the protrusion and rotatably disposed in the accommodation slot.

7. An electronic device comprising:
the connection mechanism according to claim 1; and
a housing, the first body disposed on the housing.

8. The electronic device according to claim 7, further comprising an extraneous element, wherein the housing has an opening, a first side face and a second side face, the first side face and the second side face are connected with each other, the opening is disposed on the first side face, the first body is disposed on the first side face or the second side face, and the extraneous element is removably disposed on the opening.

9. A connection mechanism comprising:
a first assembly having a first body and a limiting portion, the limiting portion disposed on one end of the first body and having an accommodation slot and a notch;
a second assembly having a second body and a blocker, the blocker disposed on one end of the second body and removably disposed on the notch; and
an elastic element disposed between the first body and the second body.

10. The connection mechanism according to claim 9, further comprising a pivot, wherein the first assembly further has a first pivot portion disposed on another end of the first body, the second assembly further has a second pivot portion disposed on another end of the second body, the first pivot portion and the second pivot portion are connected with each other by the pivot, and the second assembly and the first assembly are rotatable relative to each other.

11. The connection mechanism according to claim 9, wherein the first assembly further has a sliding slot, the second body of the second assembly is a slider, and the slider is slidably disposed in the sliding slot.

12. The connection mechanism according to claim 9, wherein the first body has a first surface, the second body has a second surface, the first assembly further has a first extending face and a first end face, the second assembly further has a second extending face and a second end face, the first extending face is connected to the first surface, an inner side face of the accommodation slot is connected to the first extending face and the first end face, the second extending face is connected to the second surface and the second end face, and the first extending face and the second extending face are respectively an inclined surface.

13. An electronic device comprising:
the connection mechanism according to claim 9;
a housing, the first body disposed on the housing; and
an extraneous element having a connection portion, the extraneous element and the connection mechanism pivotally connected with each other by the connection portion and the accommodation slot, and the blocker removably disposed on the notch.

14. The electronic device according to claim 13, wherein the extraneous element further has a protrusion, the connection portion is a shaft, and the shaft is disposed on the protrusion and rotatably disposed in the accommodation slot.

15. An electronic device comprising:
the connection mechanism according to claim 9; and
a housing, the first body disposed on the housing.

16. The electronic device according to claim 15, further comprising an extraneous element, wherein the housing has an opening, a first side face and a second side face, the first side face and the second side face are connected with each other, the opening is disposed on the first side face, the first body is disposed on the first side face or the second side face, and the extraneous element is removably disposed on the opening.

17. An electronic device comprising:
a housing;
a connection mechanism comprising: a first assembly having a first body and a limiting portion, the limiting portion disposed on one end of the first body, the limiting portion having an accommodation slot and a notch, and the first body disposed on the housing; and a second assembly having a second body and a blocker disposed on one end of the second body, and the second body movably disposed on the first body; and
an extraneous element having a connection portion, the extraneous element and the connection mechanism pivotally connected with each other by the connection portion and the accommodation slot, and the blocker removably disposed on the notch.

18. The electronic device according to claim 17, wherein the housing has an opening, a first side face and a second side face, the first side face and the second side face are connected with each other, the opening is disposed on the first side face, the first body is disposed on the first side face or the second side face, and the extraneous element is removably disposed on the opening.

19. The electronic device according to claim 17, wherein the extraneous element further has a protrusion, the connection portion is a shaft, and the shaft is disposed on the protrusion and rotatably disposed in the accommodation slot.

20. The electronic device according to claim 19, wherein the second assembly has a first stop portion disposed on the end of the second body, the extraneous element has a second stop portion formed on the protrusion, and when the second stop portion abuts the first stop portion, the first stop portion stops the extraneous element moving.

* * * * *